Figure 1:
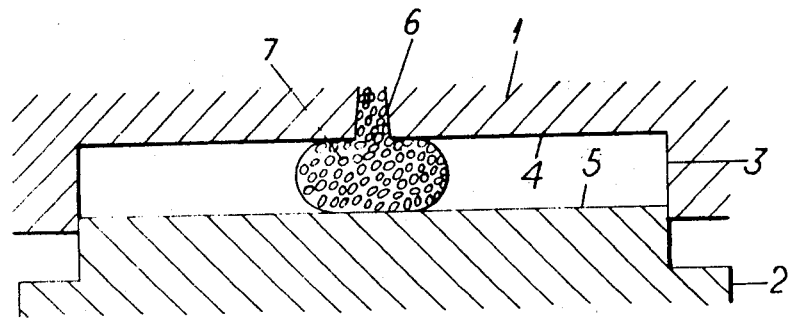

United States Patent [19]

Barrie

[11] 3,906,066

[45] Sept. 16, 1975

[54] INJECTION MOULDING PROCESS

[75] Inventor: Ian Torrance Barrie, Wheathampsted, England

[73] Assignee: Imperial Chemical Industries Limited, London, England

[22] Filed: Jan. 12, 1973

[21] Appl. No.: 322,940

[30] Foreign Application Priority Data

Jan. 20, 1972 United Kingdom............... 2814/72

[52] U.S. Cl. ............... 264/45.5; 264/51; 264/53; 264/54; 264/55; 264/328; 264/DIG. 83
[51] Int. Cl. .................. B29d 27/00; B29f 1/00
[58] Field of Search .... 264/45, 51, 53, 54, DIG. 83, 264/55, 328

[56] References Cited
UNITED STATES PATENTS
3,751,534   8/1973   Oxley.................................. 264/45

FOREIGN PATENTS OR APPLICATIONS
1,176,813   1/1970   United Kingdom.................. 264/45
1,156,217   6/1969   United Kingdom.................. 264/45
1,219,097   1/1971   United Kingdom.................. 264/45
1,255,970   12/1971  United Kingdom.................. 264/45
1,195,404   6/1970   United Kingdom

OTHER PUBLICATIONS

"Molding of Plastics," Ed. by Bikales, p. 12–13, Wiley–Interscience, New York, 1971.

Primary Examiner—Eugene C. Rzucidlo
Attorney, Agent, or Firm—Cushman, Darby & Cushman

[57] ABSTRACT

A sandwich moulding process wherein synthetic resins are sequentially injected into a mould cavity wherein opposing walls of the mould cavity are forced to move closer together, at least while the changeover from injecting the first to the second materials takes place, so as to "squeeze" the injected material to keep it moving outwards from the injection point.

8 Claims, 7 Drawing Figures

INJECTION MOULDING PROCESS

This invention relates to an injection moulding process and in particular to a process for the production of articles having a skin of synthetic resin material enclosing a core of dissimilar synthetic resin material at all points away from the sprue area of the moulding, i.e. the area corresponding to the position or positions wherein the materials are injected into the mould cavity.

Such articles may be made by sequentially injecting the skin and core materials into a mould cavity so that the core material is injected to within the skin material and extends the latter to fill the mould cavity. An example of this process, wherein the core material is foamable, is described in our British Pat. specification No. 1,156,217.

In order to achieve rapid moulding cycles it is desirable that the walls of the mould cavity into which the materials are injected are heated or cooled, as appropriate, to enhance solidification of the synthetic resin material. The mould temperatures are conveniently those utilised for the conventional injection moulding of the skin material, or, where one of the materials is thermosetting, the temperatures normally utilised for injection moulding of that thermosetting material. Thus where both the synthetic resin materials are thermoplastics that are solidified by cooling, the mould walls are preferably maintained at a temperature below the softening point of the skin material e.g. at a temperature in the range 0° to 100°C by water or oil circulating within the mould members defining mould cavity. Where one or both of the synthetic resin materials are thermosetting i.e. materials that are converted to the solidified state by heating, the mould walls are preferably heated to the temperature necessary to effect solidification of the thermosetting resin.

Except where the skin material is thermoplastic and the core thermosetting in which case a heated mould would be utilised to effect curing of the core material, on injection of synthetic resin material into the mould cavity, the material adjacent to the walls solidifies before that in the centre of the cavity. As the material is injected into the mould cavity, it contacts the mould wall and then spreads out from the injection orifice, herein termed sprue channel, towards the mould extremities. Thus while material is being injected, the melt front is continuously moving until it is halted by contact with the mould wall. We have noticed that if the melt front temporarily stops moving before the mould cavity is filled, a line may appear on the surface of the moulded article at a point corresponding to the position of the melt front when it was temporarily halted. This line is believed to be caused by preferential solidification of the melt at the point where the melt front is stationary. Some materials exhibit this line, herein termed a hesitation mark, to a greater extent than other materials.

During the injection cycle it is necessary to inject different materials, i.e. the skin material and then the core material, and so it is necessary to switch from injection of one material to another. While it is possible to arrange that the switchover is very rapid nevertheless a hesitation mark is still liable to occur.

In some cases it may be possible to arrange that injection is continuous, for example by arranging plugs of the materials to be injected in series in an injection barrel of an injection moulding machine. While this may avoid hesitation marks, it is less versatile than systems using separate injection barrels as the same injection conditions, e.g. temperatures, have to be used for each material and also contamination of the skin material by core material is possible.

While it is also possible to devise switching mechanisms to select between two injection barrels so that injection of core material commences before injection of skin material is completed and so no temporary stopping of the melt front occurs, there is still often the possibility of contamination of skin material by core material.

We have now devised a system wherein temporary halting of the melt front is avoided independently of the method of switching between the injection of skin material and injection of core material.

Therefore, according to the present invention, we provide a process for the production of injection moulded articles having a skin formed from an injection mouldable synthetic resin material surrounding a core formed from a dissimilar injection mouldable synthetic resin material at all points away from the sprue area of the moulding wherein the skin material is injected, in a fluid state, into a mould cavity and subsequently, but before the interior of the skin material has solidified, core material is injected, in a fluid state, to within the interior of the skin material so as to extend the latter to fill the mould cavity, characterised by injecting an amount of skin material into the mould cavity that is insufficient to fill the mould cavity but is sufficient to contact opposed mould walls of the mould cavity before injection of core material and, at least while the switchover from injecting skin material to injecting core material is taking place, forcing said opposed mould walls closer together so that the skin material therebetween is squeezed outwards from the injection orifice.

By forcing the opposed mould walls together the skin material is squeezed outwards so that the melt front does not come to a temporary halt during the switchover from injecting skin material to injecting core material.

In our British Pat. specification No. 1,255,970 we described a process whereby hesitation marks may be avoided by filling the mould cavity with the skin material and then allowing the mould cavity to enlarge to accommodate the core material. In that specification we described a technique to ensure filling of the mould cavity with the skin material wherein the mould cavity volume was reduced prior to injecting the core material so that the skin material was squeezed to the extremities os the cavity. In contrast thereto, by reducing the mould cavity volume while the switchover from injecting skin material to injecting core material is taking place, the necessity for filling the mould cavity with the skin material is avoided.

The movement of the opposed mould walls may be accomplished by, prior to switchover, having the mould members spaced apart and causing them to close together under the action of the mould clamping force while switchover takes place.

Naturally, if a mould of the well known "horizontal flash" construction is used, the pair of mould members defining the mould cavity must initially be spaced apart while skin material is being injected and must be forced together to squeeze the injected skin material outwards so that they contact each other along the parting line to close the mould cavity before skin material has reached the mould parting line.

If the so called "vertical flash" mould construction is used, i.e. wherein the mould cavity is enclosed but variable in volume by the mould members sliding with respect to one another, the squeezing of the skin material may be accomplished by relative sliding of the mould members.

The movement of the opposed mould members squeezing the skin material outwards may also be continued after switchover so as to assist filling of the mould cavity, particularly when using vertical flash construction moulds. Indeed the movement of the mould members towards each other thus squeezing of the skin material may be continued, if desired, until after completion of injection of the core material, although this is generally not necessary.

As explained hereinafter we prefer to inject a further charge composed of skin material after injection of the core material. Generally this further charge of skin material will only amount to a very small percentage, often 1% or less, of the total weight of material injected. In such a case there is generally no need to force the mould members closer together during switchover from injecting core material to injecting the further amount of skin material. However, if the further charge of skin material amounts to more than about 5% by weight of the total material injected, for the reasons mentioned above, we prefer that the mould members are also forced closer together during the switchover from injecting core material to injecting the further charge of skin material. In this case the movement of the mould members may be continuous from before commencement of injection of core material until after completion of core material injection or there may be a period during core material injection when no movement of the opposed mould members takes place.

By the technique of the present invention the distance between the opposed mould walls is initially greater than at completion of injection. This also enables, in some cases, thinning of the skin layer on the mould wall opposite to the injection orifice caused by the scouring action of the injection of the core material to be reduced.

The proportion of skin to core material that should be injected will depend on a variety of factors including temperatures and mould cavity shape but normally it is desired to use the minimum amount of skin material that is consistent with the desired properties of the article and that is sufficient to prevent the core material bursting through the skin. This latter amount can be determined by a few trial mouldings, varying the proportions of skin and core materials.

The amount and rate at which the opposed mould surfaces should be forced together will likewise depend on a variety of factors but again can be determined by a few trial mouldings.

Plastics materials that may be used in the present invention are those which can be injected into a mould cavity while in the state of a viscous liquid and which can thereafter be caused to solidify in the mould cavity. Thus thermoplastic resinous materials may be used which can be injected in the form of viscous melts and allowed to solidify in the mould cavity by cooling. Alternatively thermosetting resinous materials may be used which can be injected into the mould cavity in the state of a viscous liquid and then caused to solidify by effecting cross-linking while in the cavity. Generally the thermosetting resinous materials are cross-linked by heating.

Examples of suitable injection mouldable thermoplastic resins which may be used include polymers and copolymers of $\alpha$-olefines, such as high and low density polyethylene, polypropylene, polybutene, poly-4-methyl pentene-1, propylene/ethylene copolymers, copolymers of 4-methyl pentene-1 with linear $\alpha$-olefines containing 4 to 18 carbon atoms, and ethylene/vinyl acetate copolymers; polymers and copolymers of vinyl chloride, vinyl acetate, vinyl butyral, styrene, substituted styrenes such as $\alpha$-methyl styrene, acrylonitrile, butadiene, methyl methacrylate, vinylidene chloride. Specific examples of such polymers include vinyl chloride homopolymers and copolymers of vinyl chloride with vinyl acetate, propylene, ethylene, vinylidene chloride, alkyl acrylates such as 2-ethyl hexyl acrylate, alkyl fumarates, alkyl vinyl ethers, such as cetyl vinyl ether, and N-aryl maleimides such as N-O-chlorophenyl maleimide; polyvinyl acetate, polyvinyl butyral; polystyrene, styrene/acrylonitrile copolymers; copolymers of butadiene with methyl methacrylate and/or styrene and optionally acrylonitrile; polymethyl methacrylate; copolymers of methyl methacrylate with minor amounts of alkyl acrylate such as methyl acrylate, ethyl acrylate and butyl acrylate; copolymers of methyl methacrylate, N-aryl maleimides and optionally styrene; and vinylidene chloride/acrylonitrile copolymers, melt processable copolymers of tetrafluoroethylene and hexafluoropropylene.

Halogenated polymers or copolymers may be used; for example halogenated $\alpha$-olefine polymers, such as chlorinated polyethylene, or halogenated vinyl chloride polymers, such as chlorinated polyvinyl chloride.

Other injection mouldable thermoplastic polymers that may be used include condensation polymers such as the injection moulding grades of linear polyesters such as polyethylene terephthalate; polyamides such as polycaprolactam, polyhexamethylene adipamides and copolyamides such as copolymers of hexamethylene diamine adipate and hexamethylene diamine isophthalate, particularly those containing from 5 to 15% by weight of hexamethylene diamine isophthalate; polysulphones and copolysulphones; polyphenylene oxides; polycarbonates, thermoplastic polymers and copolymers of formaldehyde; thermoplastic linear polyurethanes; and the thermoplastic derivatives of cellulose such as cellulose acetate, cellulose butyrate, and mixed cellulosic esters, for example cellulose acetate butyrate.

Where a copolymer is used, the amounts of the co-monomers that are used in the copolymer will depend, inter alia, on the properties required of the moulding.

Thermosetting resins include plastics materials that either undergo cross-linking of their own accord or in the presence of a hardener or catalyst when heated to a sufficiently high temperature. Thus the term includes a material falling within the commonly understood ambit of the term "thermosetting", and also a plastics material which is normally thermoplastic but contains a cross-linking agent such as a peroxide which causes cross-linking when the plastic is heated to a sufficiently high temperature.

Examples of suitable thermosetting resins that may be used include phenol-aldehyde resins, amineformaldehyde resins, epoxy resins, polyester resins, thermosetting polyurethanes, and vulcanisable rubbers.

The resins may contain a hardening agent or catalyst where this is necessary to enable the resin to set.

Injection mouldable cross-linkable thermoplastics include copolymers of methyl methacrylate and glycol dimethacrylate and ethylene/vinyl acetate copolymers containing a cross-linking agent.

Blends of plastics materials may be used.

The choice of materials from which the article is to be made will depend upon the use to which the article is to be put. The process of the present invention does, however, provide a particularly useful way of producing articles having a core of relatively cheap material provided with a good facing. For example, the core may be of a thermoplastic material containing a filler whereas the outer skin of a material may provide any desired surface finish. Alternatively additives such as pigments, UV stabilizers, fire retardants may be added only to the skin and omitted from the core. If the process is used to produce parts of the bodies of motor vehicles then a stiff outer skin will be required and filled polypropylene is a particularly good resin from which to form the outer skin. However, if a flexible moulding is required, for example, for the interior trim of a motor car then plasticised vinyl chloride polymer will be eminently suitable as the outer layer of the moulding.

The core material may be the same as the skin material with the exception of additives which are included in one or in the other of the materials or in both but in different proportions. Alternatively the plastics may be quite different and also may contain different additives.

The skin and core materials may be injected at different temperatures, conveniently the temperatures normally used for conventional injection moulding of the individual materials. It will be realised however that the skin material should be one that will not decompose at the injection temperature of the core material within a period of time comparable with the time taken to fill the mould with the molten material.

In a prefered embodiment, the core material is foamable. Preferably it comprises a polymeric material and a blowing agent that evolves a gas on heating above a certain temperature, herein termed the activation temperature, e.g. by volatilisation (when the pressure on the commposition is reduced) or by decomposition and is injected at a temperature above the activation temperature of the blowing agent.

If the core material is injected at the customary injection rates and pressures used in injection moulding, substantially no foaming will occur until the desired amount of core material has been injected. When using a foamable core material, two alternative modes of operation may be utilised. In the first, the amount of skin material and foamable, but as yet unfoamed, core material injected is insufficient to fill the mould cavity and the core material is allowed to foam, at the same time extending the enveloping skin material to the extremities of the mould cavity. In the second mode of operation, the amount of skin material and foamable, but as yet unfoamed, core material injected is such that the cavity is filled before substantial foaming takes place, and the mould cavity is then enlarged to permit foaming to occur.

It is prefened to use the second of these alternatives as this provides a more regular cell structure in the core of the moulded article and also produces an article with superior surface finish.

In this preferred embodiment for the production of foamed mouldings as set out above, the enlargement of the mould cavity may be effected in one of two ways. One or more of the mould members defining the mould cavity may be retracted by some external force which may instantaneously enlarge the cavity to the desired extent or may gradually enlarge the cavity. Alternatively, when using a vertical flash mould configuration, the clamping pressure holding the mould members together may be reduced so that the pressure of the gases generated by the decomposition of volatilisation of the blowing agent will enlarge the mould cavity; here again the clamping pressure may be reduced gradually allowing a gradual expansion of the mould cavity or reduced instantaneously allowing a sudden expansion.

Conveniently the mould cavity may be enlarged by moving apart the opposed mould members forced towards each other during switchover from injecting skin to injecting core.

Thus in the process of the present invention, the mould members are moved towards each other, at least while switchover is taking place and, in this preferred embodiment, after the mould cavity has been filled, they are moved apart to permit foaming.

The size and shape of the mould cavity depends on the article being produced but moulds of maximum cavity thickness less than 25 mm, preferably between 2 mm and 10 mm thick, are particularly useful.

The process of the present invention is conveniently carried out using a machine containing separate injection barrels for the skin and core materials. The operation of the barrels and the movement of the opposed mould members is synchronised to achieve the required moulding cycle. We prefer that taps are provided to control the flow of material from the injection barrels into the mould cavity. Similarly, if the process of the invention is used to produce foamed core mouldings and the mould cavity is to be enlarged to allow the charge of foamable material to foam, this enlargement of the mould must be included in the programming of the machine.

As mentioned hereinbefore the process of the present invention produces articles having a skin of a plastics material surrounding and contacting a core of dissimilar plastics material except, possibly, at the sprue area of the article.

Generally injection moulded articles are removed from the mould cavity with the material solidified in the sprue channels attached thereto. These sprues are generally not part of the desired article and so are removed from the moulding after the latter is taken from the mould cavity. The area of the article from which the sprue was detached is termed the sprue area.

When the core material is injected into the mould cavity through a sprue channel to penetrate to within the interior of the skin material a small amount of core material will occur at the surface of the sprue area of the article if the sprue is detached therefrom.

The amount of the core material exposed at the sprue area can be reduced by injecting a further, small, quantity of skin material through the same sprue channel through which the core material was injected, after injection of the core material, so that, when the sprue is removed from the moulding, only a narrow annulus of core material is left exposed. This narrow annular results from core material not swept out of the sprue channel by the injection of this small further charge of skin material as it adheres to the walls of the sprue channel. However, by using high injection rates and heated sprue channels so that very little core material is left as an adhering layer on the sprue channel walls, the narrow annulus of core material exposed at the sprue area of the article can be made so narrow that it is virtually indistinguishable. Generally, as mentioned hereinbefore, the further charge of skin material will amount to less than 1% by weight of the total injected.

The process of the present invention may be used to produce a wide variety of articles. Articles with a rigid or with a flexible skin may be prepared by our process. Examples of articles with a rigid skin included articles of furniture and panels which may be building panels or panels to form the bodies of motor vehicles and trains. Examples of articles with a flexible skin which may be prepared include shoe soles, parts of the interior trim of motor cars, railway carriages, caravans, aeroplanes and a wide variety of other applications. In one embodiment of the invention at least part of one or more walls of the mould cavity may be provided, prior to the injection of the materials into the mould cavity, with a removable lining of a material that retains its shape at the temperatures at which the plastics materials are injected into the mould cavity. The skin material will then adhere to the lining when it is injected into the mould cavity and the sandwich structure article with the lining firmly bonded thereto can be removed from the mould cavity after solidification of the synthetic resin materials. Thus this technique may be used to provide a rigid backing to, for example, a cellular article having an unfoamed skin. This is particularly useful in the production of flexible mouldings for the interior trim of motor vehicles, where it is desirable to have a resilient trim with a pleasing surface which can be rigidly mounted in the motor vehicle. In this case one of the walls of the mould may be lined to provide the backing to mount the trim whereas the other is not lined thus providing the pleasing surface. Examples of suitable lining materials include wooden sheets such as plywood and hardboard, metal sheets or sheets of thermoplastic materials which retain their shape, i.e. are form stable, at the moulding temperature. Alternatively, the lining could, if desired be of a flexible material such as the upper materials of a shoe or boot on to which the sole is moulded by the process of the present invention.

Figure 2:
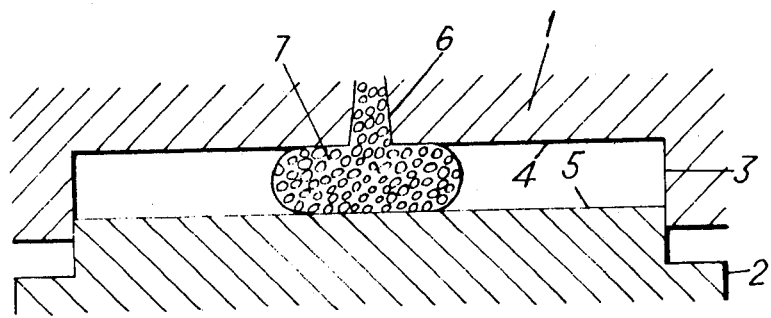
Figure 3:
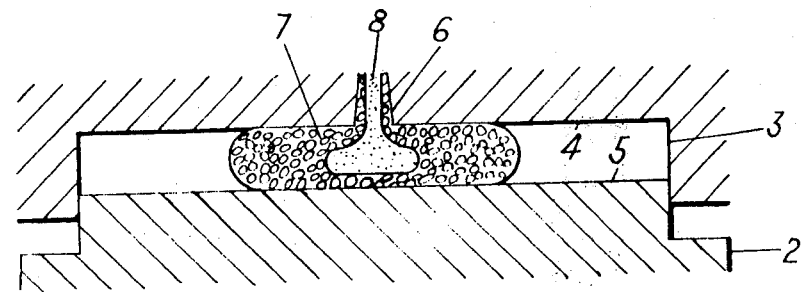
Figure 4:
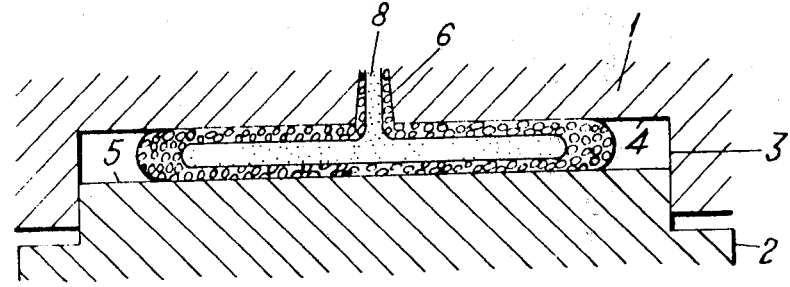
Figure 5:
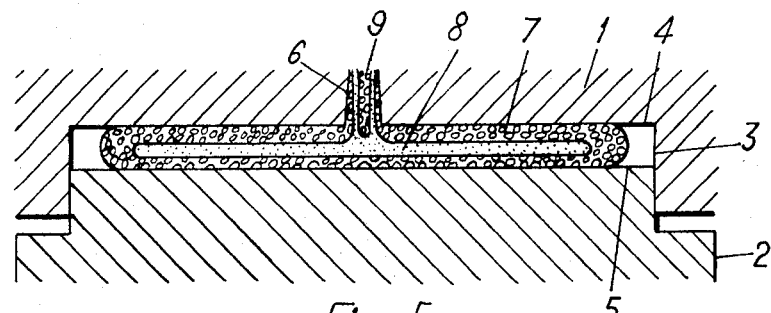
Figure 6:
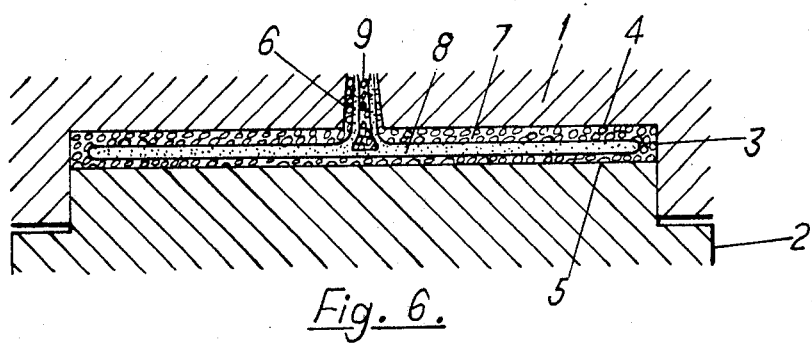
Figure 7:
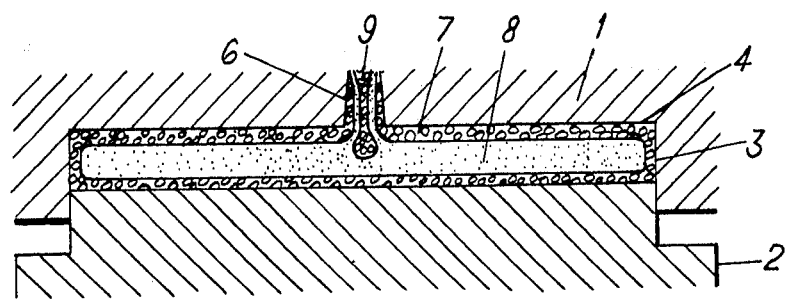

The invention is further illustrated by reference to the accompanying drawings wherein FIGS. 1 to 7 are cross sections of a mould cavity showing various stages in the moulding cycle.

The mould is a vertical flash mould comprising a pair of mould members 1, 2 which are slidably movable with respect to one another along the wall 3 of the mould cavity. The mould cavity is defined by opposed surfaces 4 and 5 of the mould members 1, 2 respectively and wall 3 of mould member 1. A sprue channel 6 is formed in mould member 1 and communicates with the mould cavity at an area in surface 4. An injection moulding machine having two injection barrels (not shown) communicates with the sprue channel 6 via a tap (not shown) of the type described in our British Pat. No. 1,219,097 whereby the injection barrels can alternately be brought into communication with sprue channel 6 or both barrels can be isolated from the sprue channel 6. The mould member 2 can be urged towards mould member 1 by a conventional hydraulic clamping ram (not shown).

Initially the mould members are spaced apart and skin material 7, is injected into the mould cavity through sprue channel 6. The skin material contacts the opposed surface 5 of the mould cavity and spreads outwards towards wall 3 (see FIG. 1). The clamp ram pressure is then increased so that mould member 2 moves towards mould member 1 thus squeezing the skin material 7 between the mould surfaces 4 and 5 (see FIG. 2). While the mould surfaces 4 and 5 are moving towards each other the tap is switched to stop the injection of skin material 7 and commence injection of core material 8, which is injected to within the skin material 7 (see FIG. 3). Injection of the core material 8 and forcing together of the mould members 1 and 2 is continued (see FIG. 4) and when the desired amount of core material has been injected, the tap is switched to inject a further amount, 9, of skin material through sprue channel 6 (see FIG. 5), continuing the forcing together of the mould members, 1 and 2. After completion of injection of the further amount 9 of skin material the mould members are forced together so that the material injected into the cavity is squeezed to fill the mould cavity (see FIG. 6). The clamp pressure is then relaxed, thereby permitting the mould members 1 and 2 to be forced apart as the core material 8 foams. As mentioned hereinbefore, where the further amount 9 of skin material is small, the forcing together of the mould members 1, 2 may be stopped after commencement of core material injection.

EXAMPLE 1

Using the procedure outlined above in relation to the drawings, a panel in the shape of a rectangle (1070 mm × 610 mm) was made using a vertical flash mould. The mould cavity was defined by two mould members maintained at 60°C by circulating water.

Initially the mould was in the 'open' position i.e. that position which enabled the moulding from the previous moulding cycle to be removed from the cavity. The mould members were then moved towards each other to close the mould, initially at a fast rate but, over the last 50 mm of their travel at a rate of 1 cm sec$^{-1}$. Injection of polypropylene skin material was commenced when the surfaces of the mould members defining opposed surfaces of the mould cavity were about 30 mm apart.

The skin material was injected at a temperature of 250°C and at a rate of approximately 800 ml sec$^{-1}$. When all the skin material had been injected, i.e. after a total injection time of about 1.7 secs, the tap was switched and then 2550 ml of a foamable polypropylene core composition comprising 0.4% by weight of azodicarbonamide as blowing agent was injected at a temperature of 200°C and at a rate of 1200 g sec$^{-1}$. Throughout the injection of the skin material, and until part of the core material had been injected, the mould members were being moved towards each other at the rate of 1 cm sec$^{-1}$. Movement of the mould members was stopped when the cavity thickness had fallen to 6 mm. After injection of the core material, the tap was switched back to the supply of skin material and a further 25 ml of polypropylene was injected at 250°C and at a rate of approximately 800 ml sec$^{-1}$. The period of interruption of material flow during the operation of the tap was about 0.1 sec for each switching operation.

After injection of the further amount of skin material, the clamping pressure was reduced and the mould members moved apart to a cavity thickness of 10 mm to allow the core composition to foam. When the moulding had completely solidified, it was removed from the mould. The resultant panel had a foamed core enclosed in an unfoamed skin and had excellent mould definition and surface finish and exhibited no hesitation mark.

EXAMPLE 2

By way of comparison, Example 1 was repeated but the mould members were moved together until the cavity thickness was 6 mm before commencement of injection of the skin material. The mould members were not moved towards each other during the injection of skin or core material or during switchover. After filling the mould the cavity thickness was enlarged, by retracting the mould members relative to one another, to 10 cm to permit foaming of the core.

The resultant panel exhibited a prominent hesitation mark and marked thinning of the skin opposite the sprue channel.

I claim:

1. In a process for the production of injection moulded articles having a skin formed from an injection mouldable synthetic resin material surrounding a core formed from a dissimilar injection mouldable synthetic resin material at all points away from the sprue area of the moulding wherein a quantity of the skin material that is insufficient to fill the mould cavity but is sufficient to contact opposed mould walls of the mould cavity is injected, in a fluid state, into a mould cavity and said opposed mould walls are moved closer together so that the skin material therebetween is squeezed outwards from the injection orifice, and before the interior of the skin material has solidified, core material is injected, in a fluid state, to within the interior of the skin material so as to extend the latter to fill the mould cavity, the improvement characterized in that said movement of the mould walls is commenced before completion of injection of said quantity of skin material and continued until after commencement of injection of the core material.

2. A process as claimed in claim 1, wherein a horizontal flash mould defined by a pair of mould members is used and the mould members are initially spaced apart while skin material is being injected and are forced together to squeeze the skin material outwards so that they contact each other along the parting line to close the mould cavity before skin material has reached the mould parting line.

3. A process as claimed in claim 1 wherein a vertical flash mould defined by mould members slidably mounted relative to one another is utilised and squeezing of the skin material is accomplished by relative sliding of the mould members.

4. A process as claimed in claim 1 wherein movement of the opposed mould members towards each other is continued until after completion of injection of the core material.

5. A process as claimed in claim 1 wherein, after injection of core material, a further quantity of skin material is injected, said further quantity not exceeding 1% by weight of total material injected.

6. A process as claimed in claim 1 wherein, after injection of core material, a further quantity of skin material is injected, and wherein while switchover from injecting core material to injecting skin material takes place, the opposed mould members are moved towards each other to squeeze the previously injected skin material outwards.

7. A process as claimed in claim 1 wherein the core material is a foamable composition and is injected at a temperature above the activation temperature of the blowing agent.

8. A process as claimed in claim 7 wherein the amount of foamable core material injected is such that the mould is filled without substantial foaming of the core material and, after the mould cavity has been filled, the mould cavity is enlarged to permit foaming of the core composition.

* * * * *